No. 701,338.  
C. D. HASKINS.  
ELECTRIC METER.  
(Application filed Oct. 28, 1901.)  
Patented June 3, 1902.
(No Model.)
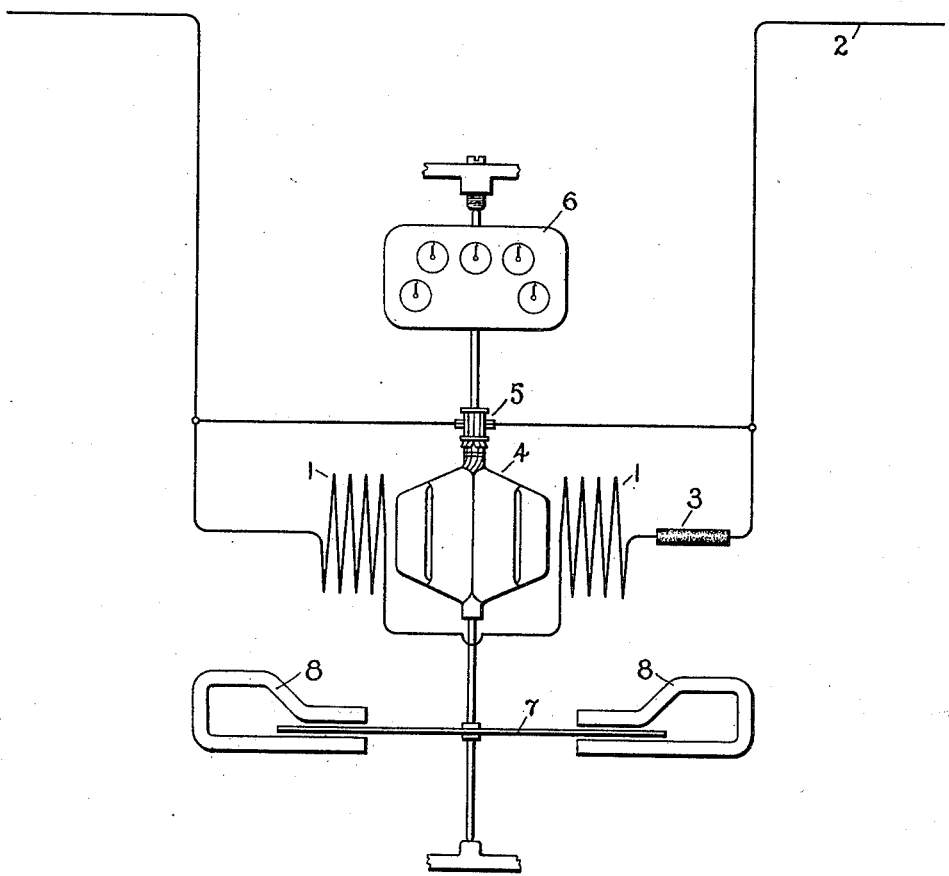
Witnesses.  
John Ellis Glenn.  
Benjamin B. Hull.
Inventor.  
Caryl D. Haskins.  
by Albert G. Davis  
Atty

UNITED STATES PATENT OFFICE.

CARYL D. HASKINS, OF SCHENECTADY, NEW YORK, ASSIGNOR TO GENERAL ELECTRIC COMPANY, A CORPORATION OF NEW YORK.

ELECTRIC METER.

SPECIFICATION forming part of Letters Patent No. 701,338, dated June 3, 1902.

Application filed October 26, 1901. Serial No. 80,039. (No model.)

*To all whom it may concern:*

Be it known that I, CARYL D. HASKINS, a citizen of the United States, residing at Schenectady, county of Schenectady, State of New York, have invented certain new and useful Improvements in Electric Meters, (Case No. 2,332,) of which the following is a specification.

My present invention is embodied in an electric meter the novel features of which are particularly pointed out in the appended claims.

For a detailed description of the invention and of its mode of operation reference is to be had to the following specification, taken in connection with the accompanying drawing, which represents my invention in diagram.

The meter shown in the drawing includes as its principal feature a motor of the direct-current type arranged and connected so that its speed of rotation approximates proportionately to the energy measured, the degree of approximation being capable of adjustment to adapt the meter for different circumstances of operation as desired.

The motor has a field-winding 1 in series with one of the mains 2 of the distribution system or electric circuit to which it is connected, and in series with the field-winding 1 is placed a body 3, of conducting material, having a negative temperature coefficient, the purpose of which will hereinafter be explained.

Shunted about the field-winding 1 and the resistance-body 3 is the armature 4 of the meter, this armature being provided with a commutator and brushes 5, as is usual in motors of the direct-current type. A registering device or counter 6 records the number of revolutions of the armature. A damping-disk 7, coöperating with damping-magnets 8, furnishes the retarding torque for the movable element.

Without the presence of the body 3 of negative temperature coefficient it will be evident that the torque of the meter would be proportional to the square of the current passing in the main 2. Under these circumstances a retarding device, such as a fan in which the retarding device is proportional to the square of the speed, would be necessary in order that the speed of the meter should be proportional at all times to the current passing. With a meter thus arranged it will be evident that the torque at light loads would be comparatively small and the meter therefore inaccurate or unreliable over this range. I have found that by inserting a body, such as 3, having a negative temperature coefficient in series with a field-winding the drop of potential about the field-circuit can be made disproportionately high on light loads or, inversely, disproportionately low on heavy loads. By a suitable proportioning of parts the resistance of the field-circuit may be caused to decrease with increasing load by an amount sufficient to make the torque of the meter bear some approximate proportion to the current passing through the meter. In such a case a retarding device in which the retardation is proportional to the speed would be necessary, and such a device I have illustrated in the drawing, as above described.

The meter above described has the advantage that on no load there is no danger of creeping, while on small loads the torque of the meter is sufficiently large to produce fairly accurate registration.

The material which I may employ for producing the effect of a negative temperature coefficient as regards the resistance of the field-circuit of the meter may of course be selected from a considerable number of different substances well known in the art. Thus I may make use of certain oxids of iron—such, for example, as magnetite.

What I claim as new, and desire to secure by Letters Patent of the United States, is—

1. In an electric meter, the combination of a field-winding, a conductor having a negative temperature coefficient in series with said winding, and an armature shunted about said field-winding and conductor.

2. In an electric meter, the combination of a field-winding and an armature connected in parallel with each other, and means for causing the drop of potential in the field-circuit to be less than proportional to the current flowing therein.

3. In an electric meter, the combination of a motive element in which the torque is produced by the mutual interaction of currents in parallel-connected circuits, and means for causing the resistance of one of said circuits to change upon variation of current in the meter at a rate different from the rate of change of the resistance in the other circuit.

4. In an electric meter, the combination of a field-winding and an armature connected in parallel relation with each other and adapted to be connected in circuit with one of the mains of an electric system, and means for causing the field-winding circuit to be of higher resistance with small currents than with large currents passing therein.

5. In an electric meter, the combination of a field-winding and an armature in parallel-connected circuits, and means for causing the resistance of one of said circuits to be greater when carrying small currents than when carrying larger currents.

6. In an electric meter, the combination of a fixed member, a relatively movable member, connections whereby current flowing in the meter produces torque of the movable member, and a resistance changing with temperature adjusted to change the law of said torque with change in the quantity measured.

In witness whereof I have hereunto set my hand this 24th day of October, 1901.

CARYL D. HASKINS.

Witnesses:
BENJAMIN B. HULL,
MARGARET E. WOOLLEY.